Aug. 13, 1935.   W. P. KESSLER   2,011,152
WINDOW CONSTRUCTION
Filed Aug. 19, 1933   6 Sheets-Sheet 3

INVENTOR
Ward P. Kessler
Hill and Hill
ATTORNEYS

Aug. 13, 1935. W. P. KESSLER 2,011,152
WINDOW CONSTRUCTION
Filed Aug. 19, 1933 6 Sheets-Sheet 5

INVENTOR
Ward P. Kessler
Hill and Hill
ATTORNEYS

Aug. 13, 1935. W. P. KESSLER 2,011,152
WINDOW CONSTRUCTION
Filed Aug. 19, 1933   6 Sheets-Sheet 6

INVENTOR
Ward P. Kessler
Hill and Hill
ATTORNEYS

Patented Aug. 13, 1935

2,011,152

UNITED STATES PATENT OFFICE 2,011,152

WINDOW CONSTRUCTION

Ward P. Kessler, Chicago, Ill., assignor to Imperial Steel Products Corporation, Chicago, Ill., a corporation of Illinois Application August 19, 1933, Serial No. 685,842

10 Claims. (Cl. 189—69)

The invention relates to windows and more particularly provides improvements in both fixed and movable sashes and frames providing a mounting for the sashes.

An object of the invention is the provision of a unitary window frame comprising an outside moulding adapted as a guide for masons or carpenters in properly locating the edge of the boundary wall relative to the window opening and provide a mounting for one leaf of a ventilator hinge and also provides a calking space having an exposed surface of uniform dimensions forming a symmetrical band about the frame and giving an artistic finish to the window.

Another object of the invention is to provide a unitary frame comprising an ornate inner moulding.

A further object of the invention is the provision of a frame preferably comprising a relatively thin unitary strip of material having outer and inner mouldings of the kind described connected by a web providing a plurality of angular and curved offsets giving an ornate appearance, wherein the mouldings and web have a maximum of rigidity for the amount of material used.

Still another object of the invention is the provision of a window frame comprising an inset of improved construction adapted as a mounting for a screen in close proximity to a fixed or movable sash carried by the frame, the inset also providing a mounting for ventilator actuating and locking members positioned outside of the screen where they do not interfere with removal or mounting of the screen on the frame.

A still further object of the invention is the provision of improved actuating or locking means for ventilators adapted to be mounted on a window frame of the kind described.

Another object of the invention is the provision of an improved frame for movable sashes or ventilators and for fixed windows.

Still another object is the provision of a novel method of rolling window frames or sashes to provide an improved mounting for weatherstrips.

A further object of the invention is the provision of improved muntins for window sash and a novel joint construction for intersecting muntins.

A further object of the invention is the provision of an improved method of assembly of intersecting muntin strips.

A still further object of the invention is the provision of improved muntin strips providing bevelled surfaces adapted as guides in placing putty whereby the putty may be easily uniformly inclined and aligned with the bevelled surfaces of the muntins and form an extension or continuation of the muntin strip. An ornate effect is secured due to the continuous surface and uniformity of inclination of the bevelled surface and putty.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawings, wherein like reference characters indicate like or corresponding parts.

Figure 1:
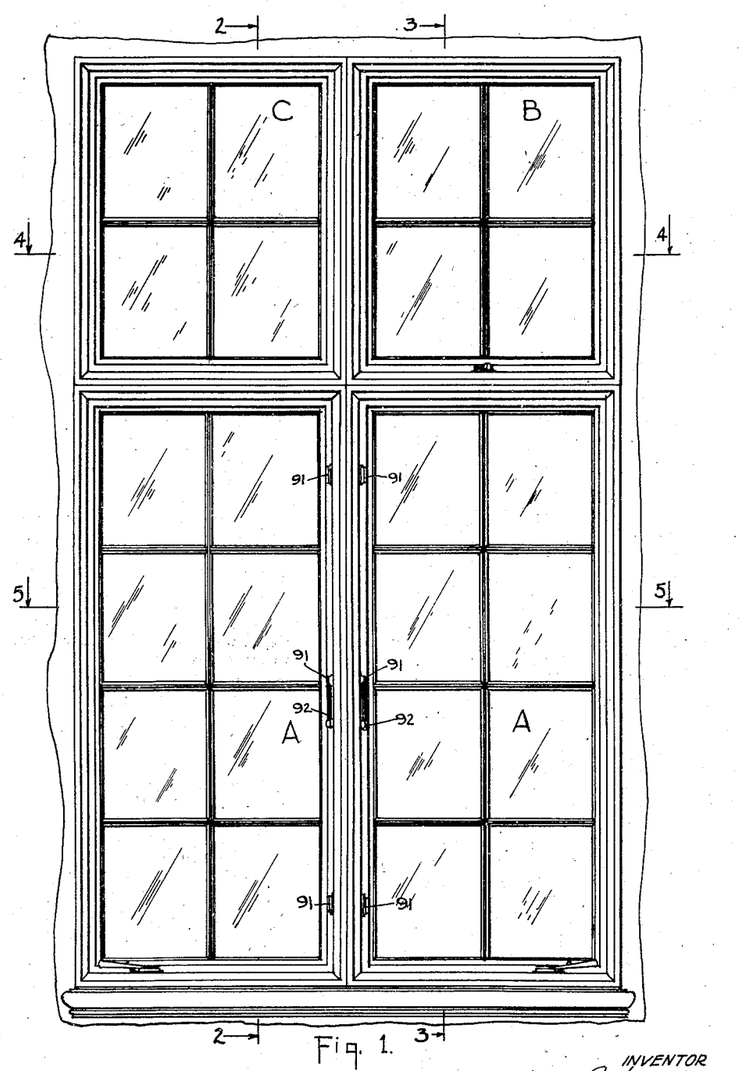
Fig. 1 is a view of a window embodying the devices of the invention.
Figures 10, 12, 13, 14:
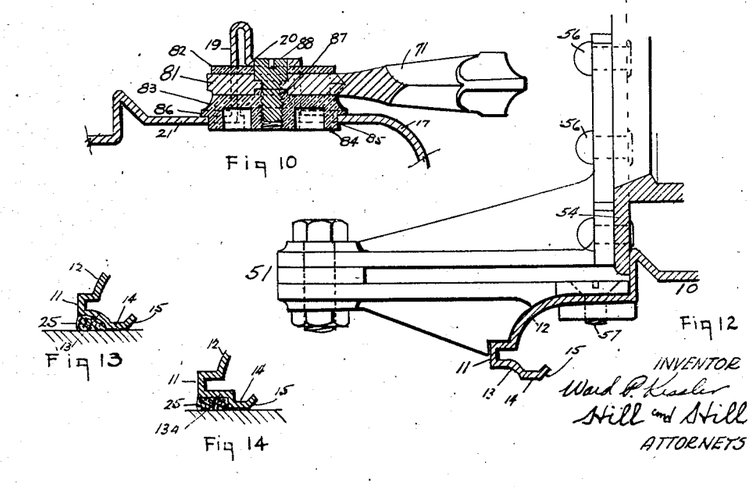
Fig. 10 is a view partially in section of still another operating device embodying the principles of the invention.
Fig. 12 is a view of a fragmentary portion of a window frame embodying the principles of the invention and illustrating the connection therewith of one leaf of a ventilator hinge.
Figs. 13 and 14 are detail views of calking spaces provided between the outer moulding and the building wall.

Referring now more particularly to the drawings, Fig. 1 illustrates a window comprising a pair of lower sections comprising ventilators and mounting frames therefor each designated as A; an upper ventilator and frame designated as B; and an upper section designated as C comprising a frame providing a mounting for glass, said frame being so constructed as to maintain the sight lines of the sections designated as A and B. The ventilators of A are each mounted in a rectangular frame 10 comprising side and end members preferably with bevelled ends suitably fastened by welding, or the like. The side and end members may be cut from a single strip of sheet metal stamped or rolled or otherwise formed to provide the desired cross sectional configuration. The frame 10 has an outer moulding comprising an angular member 11, an inwardly projecting curved member 12 and an outwardly projecting curved member 13. The curved member 13 is connected with a straight portion 14 terminating in an inwardly turned flange 15. The outer edge of the straight portion 14 provides a guide for the workman to accurately locate the boundary wall of the window and to prevent encroachment of the masonry or other wall material upon the window opening as shown in Fig. 13. The space between the curved member 13 and the building wall provides a receptacle for calking material 25 which thereby presents an exposed surface or band of uniform width extending around the window and giving a finished or symmetrical effect. An alternative form of outer moulding is shown in Fig. 14, similar to that described except that an angular member 13a is substituted for the curved member 13 and provides in combination with the adjacent wall surface an angular shaped receptacle for calking material.

The frame 10 also provides an inner moulding comprising an angular member 16 connected along one edge with a curved member 17 and at the other edge with a straight portion 18 terminating in a flange member 15. The straight portion 18 is also adapted as a guide for the workmen in locating the bounding surface of the inner wall to avoid encroachment upon the window space in the same manner as described for the straight portion 14.

The intermediate or web portion of the frame 10 includes a curved member 12 connected at one edge with the angular member 11 and at the other edge with an angular offset portion 22 providing a seat for a ventilator or sash frame. An inset 19 is connected at one edge with the curved member 17 and at its other edge with a web member 21, the inset having its inner edge forming a rabbet 20 in which a screen frame is adapted to be positioned.

Figure 5:
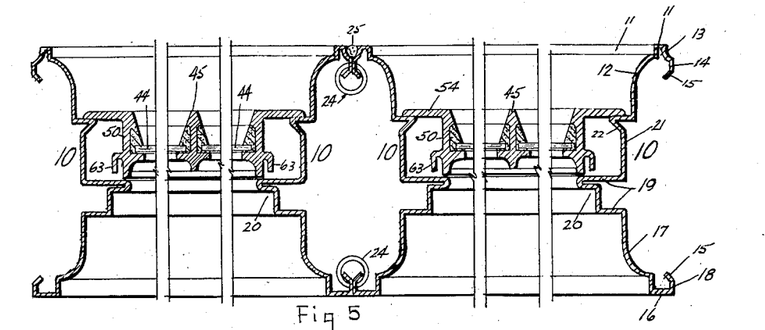

The frame members 10 are adapted as a mounting not only for individual windows but are adapted for multiple construction by their assembly in horizontal and vertical rows and tiers in which case, the adjacent frames form hollow mullions with the adjacent straight portions 14 of the outer mouldings and the corresponding straight portions 18 of the inner mouldings in contact as shown in Fig. 5. The frames 10 when assembled to form mullions are held in cooperating relation by cylindrical-shaped members 24 slit along one side and positioned as shown to permit the slit edges to engage and hold the adjoining straight portions 14 and 18 in contact, the flanges 15 serving as locking members preventing relative lateral movement of the adjacent frames.

The upper window section B, shown in Fig. 1, comprises a frame 30 providing a mounting for a ventilator similar to the ventilators mounted in the frames 10 in section A. The frame 30 is in general similar in construction and configuration to the frames 10, the outer moulding of the frame 30 differing from the outer moulding of the frames 10 by the addition of an offset member 31. The inner moulding of the frame 30 is similar to the inner moulding of the frames 10 but differs therefrom by the addition of an offset member 34 separating the angular member 16 from the curved member 17. The intermediate or web portion of the frame 30 is also similar to the web portion of the frames 10 differing therefrom by the addition of a straight section 33 supporting the inset 19 from the curved member 17. The adjacent frames 10 and 30 form a hollow mullion fastened together by tie members 24 in the same manner as adjacent frames 10 are fastened.

The window section C shown in Fig. 1 comprises a frame 35 adapted as a mounting for a fixed sash. The frame 35 is in general similar to the frames 10 and 30, the outer and inner mouldings thereof being identical with the corresponding mouldings of the frame 30. The intermediate or web portion of the frame 35 comprises an angular member 32 connected with the curved member 12 and a web member 33 connected with the curved member 17. Intermediate the member 33 and the angular member 32 the frame 35 comprises an inset bounded by an inwardly projecting straight portion 36 and a straight portion 37 at right angles thereto. A second inset is bounded by an inwardly projecting straight portion 38 connected at one edge with the portion 37 and at its other edge with a web member 39. The member 39 is connected by an angular offset 40 with a similarly positioned member 41. The member 41 is connected with an inclined member 42, the latter being connected with the angular member 42 by a straight portion 106 of substantial width. The angular offset member 40 provides a bearing for the edges of glass members 44, the member 41 being offset from the bevelled member 42 to provide a putty receptacle. The outer surface of the bevelled member 42 is adapted as a guide for the workmen in placing the putty, since by forming the exposed surface of the putty in alignment with the surface of the bevelled member 42, a smooth and uniformly inclined surface of the putty is obtained.

The frame 35 is fastened to the adjacent frames 10 and 30 by tie members 24. Obviously, the frames 10, 30 and 35 may be arranged either in horizontal or vertical tiers to produce windows of any size comprising either a fixed or movable sash or both.

Members 43 hereinafter designated fin members are shown as fastened to the upper ends of the frames 30 and 35. The fin members 43 are narrow strips of metal having their ends offset as desired to enable the workmen to accurately locate the bounding edges of wall material positioned adjacent to the frames. The stiffness or rigidity of the fin members 43 is increased by the offsets on the outer end. The inner ends of the fin members 43 are fastened to the frame 35 by welding or riveting as desired. A slot 23 between the closely spaced side walls of the insets 19 on the frames 10 and 30 is adapted to receive the fin member 43 in closely fitting wedging engagement and enables the members to be mounted in either of the frames 10 or 30 as found necessary without welding or otherwise fastening the same.

A plurality of glass members 44 are supported in the frame 35 by muntins 45. The outer edges of the muntins 45 have inwardly diverging bevelled faces 46 terminating in receptacles 47 which are filled with putty. A uniform inclination and finished appearance is given to the putty by working the same in such a manner that its exposed surface forms an extension of the adjacent face 46. The width of the receptacle 47 and the width of the inclined bevelled faces 46 are preferably identical with the corresponding portions of the member 42 and the putty in the frame 35.

Figure 20:
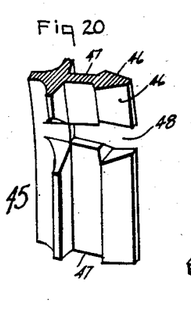
Figs. 20 and 21 are perspective views of improved muntins forming a portion of the invention adapted for assembly in intersecting cooperative relation.
Figures 21, 22, 23, 24:
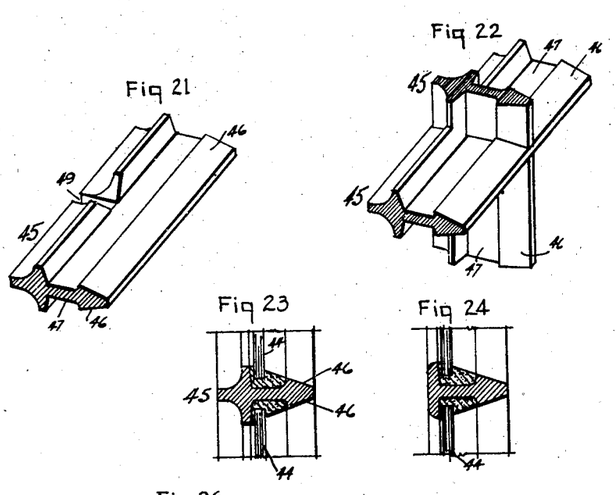
Fig. 22 is a perspective view showing the muntin strips illustrated in Figs. 20 and 21 in assembled relation.
Figs. 23 and 24 are sectional views of improved muntins providing a novel receptacle for putty and bevelled surfaces adapted as an aid to workmen in shaping the putty to a uniform inclination in alignment with the bevelled muntin surfaces.

Figs. 20, 21 and 22 illustrate fragmentary portions of the muntins 45 adjacent an intersecting joint. The muntins 45 in Figs. 20 and 21 are respectively provided with notches 48 and 49 which enable the assembly of the muntins to form a jointed intersection as shown in Fig. 22. For this purpose, the muntin 45 in Fig. 20 is bent to widen the notch 48 as shown and to permit insertion of the corresponding notched portion of the muntin 45 shown in Fig. 21 and the members are then locked in their intersecting cooperating relation as shown in Fig. 22 by straightening the bent muntin.

Each of the window sections A is closed by a ventilator comprising a frame 50 preferably formed of rolled metal. Each frame 50 has an upper and lower hinge 51, the inner leaf of which is fastened to the frame by rivets 56 as best shown in Fig. 12. The outer leaves of the hinges 51 are fastened to the adjacent moulding of the frame 10 by countersunk screws 57. Similarly, the window section B is closed by a ventilator comprising a frame 52 of similar configuration to the frame 50. The ventilator 52 has a pair of hinges 53 on its upper edge adapting it to be opened by swinging upwardly and outwardly. The hinges 53 have one leaf projecting through the angular member 52 and fastened in any suitable manner to the member 21 by rivets, or the like, (not shown). The other leaf of each hinge 53 is fastened to a projecting flange 54 on the frame 52.

Figure 28:
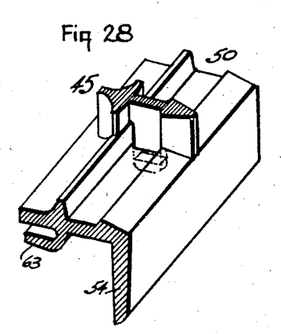
Fig. 28 is a perspective view of a portion of a sash frame illustrative of an improved connection of a muntin therewith.
Figure 29:
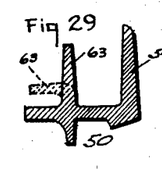
Fig. 29 is a sectional view through a ventilator sash embodying the principles of the invention providing a mounting for and illustrating a novel form of mounting for a weatherstrip as it appears at different stages of construction.
Figure 30:
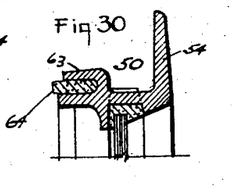
Fig. 30 is a view of a section similar to that shown in Fig. 29 with a weatherstrip in position and also showing a ventilator sash providing a bevelled surface adapted as a guide for workmen in forming the putty with an exposed surface of uniform inclination.

The frames 50 and 52 are provided with a plurality of intersecting muntins 45 on which glass members 44 are supported. The muntins 45 are identical in cross section and jointed connections with the muntins shown and described in connection with the frame 35 of section C. The ends of the muntins are fastened to the frames 35, 50 and 52 by projecting the web portion of the muntins down through apertures formed in the web portions of the frames as best shown in Fig. 28.

Figure 25:
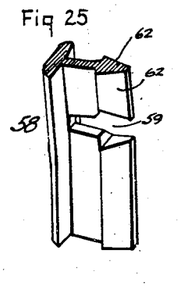
Figs. 25 and 26 are perspective views of fragmentary portions of muntins notched to form a rigid interlocking joint when assembled.
Figure 26:
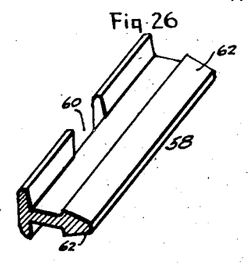
Figure 27:
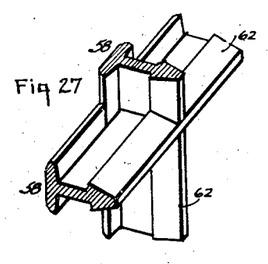
Fig. 27 is a perspective view of the assembly of the muntins shown in Figs. 25 and 26.

Figs. 25, 26, and 27 illustrate fragmentary portions of alternative form of muntin 58, one portion being shown with a notch 59 and the other with a notch 60. The muntin 58 having the notch 59 is bent adjacent the notch for insertion of the notched portion of the other muntin following which the bent member is straightened to provide the assembled joint shown in Fig. 27. The muntins 58 are provided with bevelled edges 62 adapted as guides in placing putty with uniformed inclined exposed surfaces in the same manner as described for the muntins 45.

Figures 2, 3:
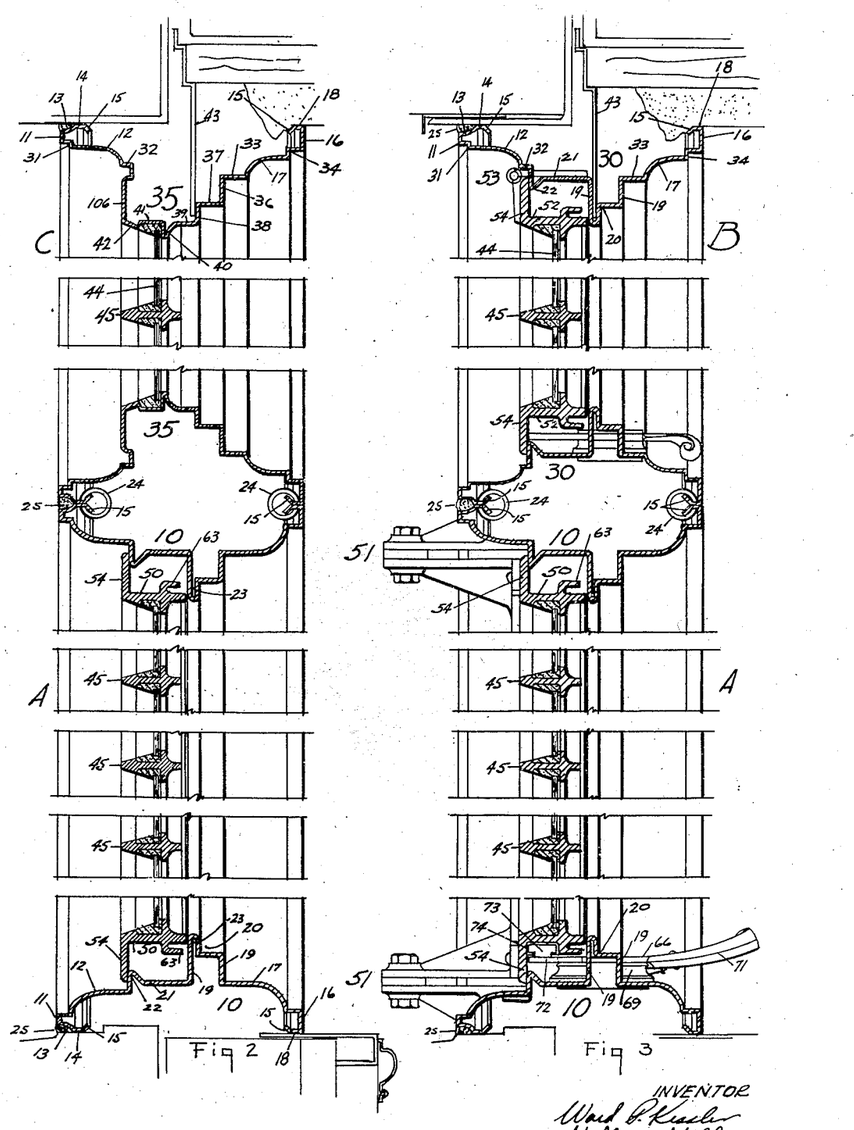
Figs. 2, 3, 4 and 5 are views along the lines 2—2, 3—3, 4—4 and 5—5, respectively, of Fig. 1 and drawn to a larger scale.
Figure 4:
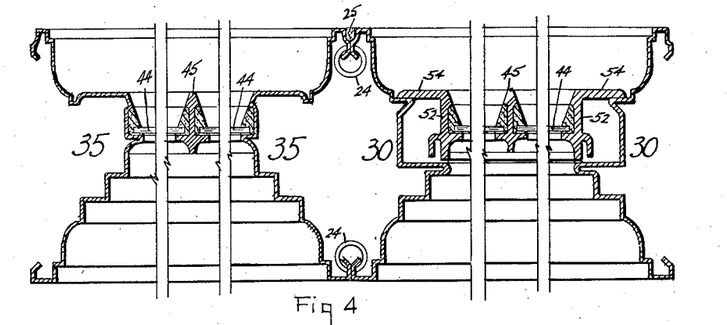

The frames 50 and 52 are provided with a member 63 bent as shown to form a holder for a weatherstrip 64 as best shown in Fig. 3. The weatherstrips 64 contact with the inset 19 of the adjacent frames 10 and 30 when the ventilators are closed and prevent access of the moisture or air as best shown in Fig. 11.

Figure 11:
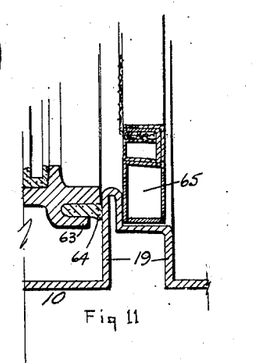
Fig. 11 is an enlarged detail view of a portion of an inset of the window frame providing a rabbet in which a screen is adapted to be mounted.

Fig. 11 also shows a typical mounting for a screen 65 in the rabbet 20 of the inset 19, the screen being either wedged to a close fit in the rabbet or it may be held in position by fasteners (not shown).

Figure 6:
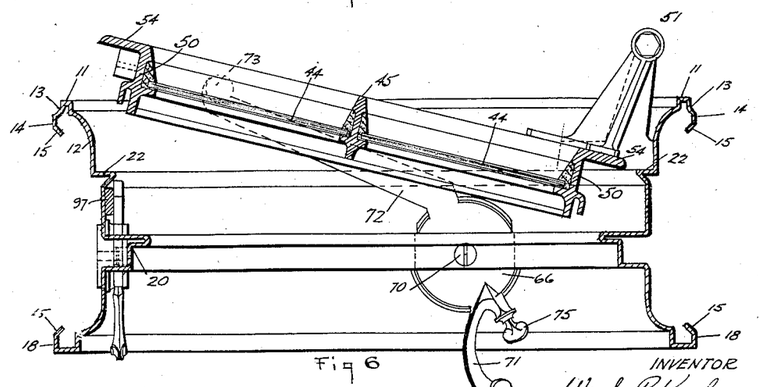
Fig. 6 is a transverse view of one of the window frames shown in Fig. 5 and of a ventilator in partially open position.
Figure 7:
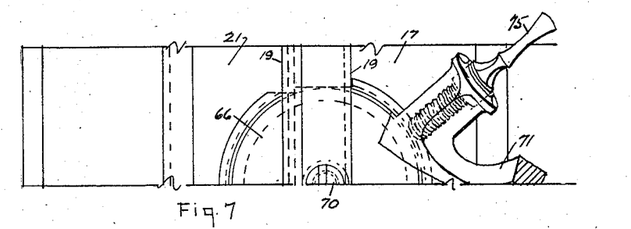
Fig. 7 is a view of a portion of the device showing the operating member by means of which the ventilator is opened and closed.
Figure 8:
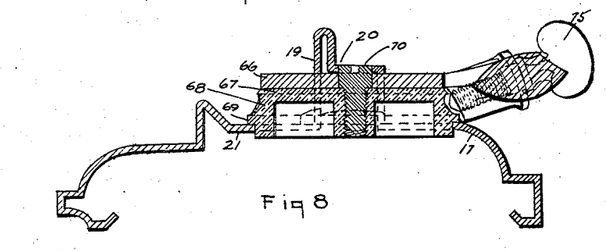
Fig. 8 is a sectional view through the operating device shown in Fig. 7.

Figs. 6, 7 and 8 illustrate an actuating or operating device mounted one each on the frames 10 and 30 for opening and closing the ventilators. The operating device comprises a disc 66 projecting through an aperture provided for that purpose in the inset 19 outside of the rabbet 20. The inner edge of the member 17 and the member 21 provide a mounting for a base or supporting member 67 on which the disc 66 is rotatably mounted. The members 17 and 21 are suitably apertured to receive a flange 68 projecting outwardly from the disc 66, the flange being positioned with an outer ring 69 resting on the members 17 and 21. The supporting member 67 is held against rotation by wedging engagement with the members 19 or by welding or any other suitable manner. A screw 70 threaded into the member 67 has a circular head providing a pivot for the disc 66, the head terminating short of or otherwise with the outer edge of the rabbet 20 so as not to interfere with the mounting of the screen frame 65 shown in Fig. 11.

The disc 66 is rotated by means of a handle 71 to open and close the ventilator for actuating an arm 72 fastened on the disc and extending underneath and parallel to the ventilator frame when the latter is closed as shown in Fig. 3. Fig. 6 illustrates the ventilator in partially open position and the angular connection of the arm 72 with the disc 66. The arm 72 terminates in an inwardly projecting ferrule-shaped member 73 projecting into a U-shaped member 74, the latter being fastened in any suitable manner to the web of the ventilator frame as best shown in Fig. 3. The member 14 provides a runway for the member 73 and has inturned flanged edges projecting under the head of the member 73 to hold the latter in position in its runway. Rotation of the disc 66 by actuating the handle 71 moves the member 73 in the runway and exerts lateral pressure on the ventilator operable to rotate the latter about its hinges 51. The ventilator is locked in closed or any desired open position by means of a thumb screw 75 mounted on the handle 71 adjacent the disc 66 and operable to engage the outer periphery of the holding member 67 and lock the handle against rotation.

Figure 9:
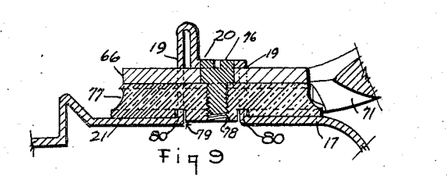
Fig. 9 is a sectional view of an alternative embodiment of an operating device for the ventilator.

An alternative form of mounting for the ventilator actuating device is shown in Fig. 9 wherein the disc 66 is pivoted about a screw 76 mounted in a base member 77. The base member 77 provides a boss 78 projecting through an aperture 79 in the members 17 and 21, the latter providing an inturned flange 80. The base member 77 is fastened to the members 17 and 21 in any suitable manner such as by welding or the like.

Still another form of mounting for the ventilator actuating device is shown in Fig. 10, the handle 71 and arm 72 being connected by a disc 81 on which a washer 82 is superimposed in contact with one bounding wall of the rabbet 20. A base member 83 provides a support for the disc 81, the member having an outwardly projecting flange 84 extending through an aperture 85 in the members 17 and 21. The base member 83 is provided with a ring 86 in bearing engagement with the inner face of the members 17 and 21. A central boss 87 projecting into a corresponding aperture in the disc 81 provides a mounting for a screw 88. The boss 87 and the head of the screw 88 form a pivot by which the disc 81 is rotatable. The member 83 is fastened to the members 17 and 21 in any suitable manner such as by welding, or the like.

Figure 15:
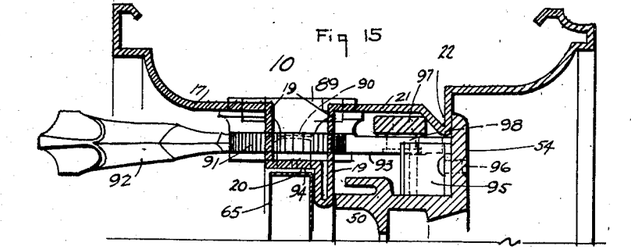
Fig. 15 is a sectional view through a window frame and a sash frame adjacent a locking device for a ventilator mounted thereon.
Figure 16:
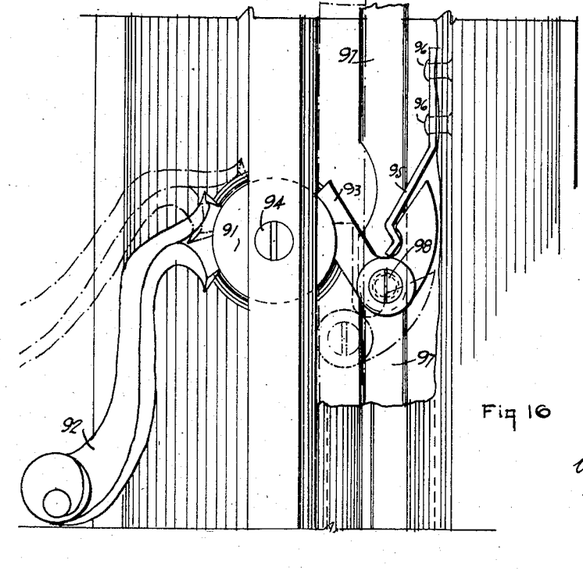
Fig. 16 is another view of the locking device shown in Fig. 15.
Figure 17:
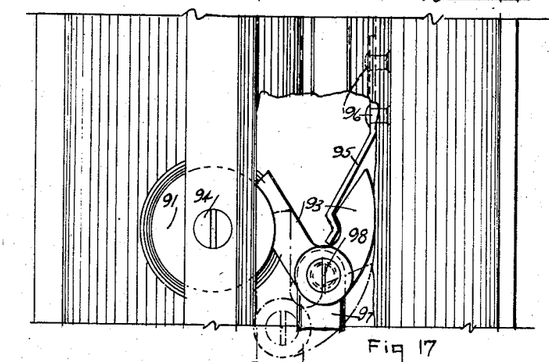
Fig. 17 is a view of still another locking device operatively connected with locking device shown in Figs. 15 and 16 for a ventilator.

A novel form of ventilator latch and locking device including an improved keeper is shown in Figs. 15, 16 and 17. Referring to Fig. 1, it will be observed that each window section A has a ventilator equipped with three of the locking devices arranged in a vertical row, the middle device being illustrated in detail in Figs. 15 and 16 and the upper and lower device being shown in detail in Fig. 17. The latch members are mounted in the inset 19 of the frame 10 in such manner as to permit a screen 65 to be mounted in or removed from the rabbet 20 formed along one edge of the inset. Each latch device comprises a base member 89 fastened in any suitable manner to the members 17 and 21 on each side of the inset 19. The base members 89 each provide a pivot member 90 projecting into the inset 19 to form a pivotal mounting for a disc 91. A screw 94 having its head countersunk within one bounding wall of the rabbet 20 holds each base member 89 against lateral movement. The disc 91 comprising a portion of the middle locking device is rotatable about a handle member 92 and operable thereby to move an angular latch member 93 into operative engagement and disengagement with a keeper member 95. The keeper members 95 are mounted on the flange 54 of the ventilator sash 50 and fastened by rivets 96. The members 95 are resilient being preferably constructed of spring steel to permit movement of the free end to operatively engage and disengage the latch member 93 when the latter is actuated by the handle member 92. The keeper members 95 are sufficiently rigid to hold the ventilator sash 50 firmly in closed position. The upper and lower keeper members 95 are identical in construction with the intermediate keeper member already described. The upper and lower locking members are similar to the intermediate locking member as described except that they have no handle member but are operatively connected with the intermediate locking member by links 97, engaging pivot members 98 mounted on the latch member 93. Rotation of the intermediate or middle disc 91 similarly actuates each of the other discs 91, thereby operatively engaging and disengaging each latch member 93 with its cooperating keeper members 95 by actuation of the single handle member 92. The resilience of the keeper members 95 avoids the necessity of field work in adjusting the latch members 93 to a close fit which is otherwise necessary when rigid keeper members are provided.

Figure 18:
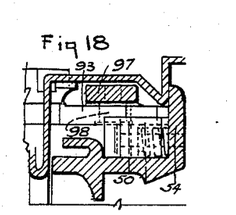
Figs. 18 and 19 are views of an alternative form of keeper member or latch holding means.
Figure 19:
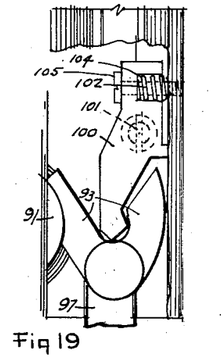

An alternative form of locking means for the latch members 93 is shown in Figs. 18 and 19 as comprising a rigid keeper member 100 mounted on the ventilator sash 50 and adapted for slight rotation by a pivot 101. The member 100 projects beyond the pivot 101 a substantial distance and provides a clearance space with the adjacent flange 54 of the sash frame 50. Movement of the latch member 93 permits operative engagement and disengagement with the cooperating keeper members 100 and correspondingly moves the outer ends of the members 100 towards the flange 54 against the resistance of a spring 102. The springs 102 are each mounted in an aperture 104 formed in the adjacent keeper member 100 with one end abutting the flange 54 and the other end abutting the keeper member. A screw bolt 105 mounted on the frame 54 and extending through the keeper members 100 provides a mounting for the springs 102. The head of the bolt 105 forms a stop limiting the movement of the adjacent end of the keeper member away from the flange 54. The spring 102 maintains the keeper member 100 and the latch member 93 in operative engagement in such a manner that the ventilator sash snugly fits against the flange 54 and yields to permit movement of the keeper members in opening and closing the ventilator.

Thus it will be seen that I have provided an improved window construction including a frame adapted for cooperation with adjacent frames to form hollow mullions and providing an improved mounting for a hinge; the frame also including a rabbeted inset member providing a mounting for a screen and for ventilator locking and actuating devices positioned to permit removal of the screen without interference; the inset member also adapted as a holder for a wall material alignment member of novel construction; the frame also providing members adapted as a material line and providing a calking aperture at the junction of the frame with the building wall; and a novel keeper member of improved construction mounted on the ventilator for operative engagement of improved locking means therewith.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A window frame of the kind described providing an inset member, a ventilator mounted on said frame and adapted to closely fit one side of said inset member, the other side of said inset member providing a rabbet adapted as a mounting for a screen in close proximity to the closed ventilator, said rabbet lying within the periphery of said frame a substantial distance, and ventilator actuating means extending through said inset member outside of said rabbet, said means including a handle member on the side of the inset member opposite to the ventilator and manually operable to actuate said means to open and close the ventilator.

2. A window frame of the kind described comprising an inset member, a ventilator swingably mounted on said frame, said ventilator when closed adapted to thereby fit one side of said inset member, the inner edge of the other side of said inset member providing a rabbet adapted as a mounting for a screen in close proximity to the closed ventilator, a locking device projecting through said inset member outside of said rabbet, said locking device being operable from the rabbeted side of said inset member to fasten the ventilator in closed position.

3. A window frame comprising side and end members each providing an outer and an inner moulding connected by a web member, said web members each providing an inset member, a ventilator swingably mounted on said frame, said ventilator when closed adapted to closely fit one side of said inset members, the inner edge of the other side of said inset members providing rabbets adapted as a mounting for a screen in close proximity to the ventilator when closed, ventilator actuating means extending through one of said inset members outside of its rabbet, said means including a handle member on the side of the inset member opposite to the ventilator and manually operable to actuate said means to open and close the ventilator.

4. A window frame comprising side and end members each providing an outer and an inner moulding connected by a web member, said web members each providing an inset member, a ventilator swingably mounted on said frame, said ventilator when closed adapted to closely fit one side of said inset members, the inner edge of the other side of said inset members providing rabbets adapted as a mounting for a screen in close proximity to the closed ventilator, a locking device extending through said inset member outside of its rabbet, said locking device being manually operable from the rabbeted side of said inset member to fasten the ventilator in closed position.

5. A window frame comprising unitary side and end members each providing a web member, the opposite edges of said web members each terminating in a moulding receding from the window opening, the outer periphery of said moulding having inturned members connected therewith and receding from the web member, said receding inturned members each terminating in a strip inturned members equidistant from the web members, said strips having flanged edges inclined towards said web member.

6. A window frame of the kind described comprising a sheet of metal shaped to provide a web member terminating at each edge in a receding moulding, the outer periphery of each of said mouldings terminating in an inwardly extending flanged member, spaced from and convergent towards the adjacent moulding and web member, the outer portion of said flanged members being inclined away from the mouldings to form boundary walls for calking spaces, the inner edges of the flanged members being inclined towards the web member, and the intermediate portions connecting said outer and inner portions being perpendicular to the window frame and in alignment.

7. A plurality of window frames of the kind described, each frame comprising a sheet of metal shaped to provide a web member terminating at each edge in a receding moulding, the outer periphery of each of said mouldings terminating in an inwardly extending flanged member, the edges of said flange members being convergent towards the web member, adjacent frames being arranged in contiguity to form a hollow mullion with the flange members of adjacent frames in contact, and means for fastening said flanges in contact, said means comprising a pair of tubular members each having a longitudinally extending slot in one side wall in which said flanged members are positioned with the free edges of said flanged members surrounded by and extending through the tubular member.

8. A window frame comprising unitary side and end members each providing a web member the opposite edges of which terminate in a moulding, a ventilator adapted to close said frame, a pair of double leaf hinges providing a mounting for said ventilator, one leaf of each hinge being fastened to a moulding and the other leaf fastened to the ventilator, an inset member projecting inwardly from the web member to provide a bearing for the ventilator when closed, ventilator actuating means mounted in the inset member, said means including a handle member on the side of the inset member opposite to the ventilator, said handle member operable to actuate said means to open and close the ventilator.

9. A window frame comprising side and end members each comprising a sheet of material forming a web member, a portion of said sheet being extended inwardly to form a generally U-shaped inset member, one side of said inset member being offset to provide a rabbet adapted as a mounting for a screen in close proximity to the closed ventilator, one bounding edge of said rabbet being in closely spaced parallel relation to the other side wall of the inset member and forming therewith a narrow channel opening outwardly.

10. A window frame comprising side and end members each comprising a sheet of material forming a web member, a portion of said sheet being extended inwardly to form a generally U-shaped inset member, one side of said inset member being offset to provide a rabbet adapted as a mounting for a screen in close proximity to the closed ventilator, one bounding edge of said rabbet being in closely spaced parallel relation to the other side wall of the inset member and forming therewith a narrow channel opening outwardly, a bar having one end wedged in said channel, the other end of the bar being offset as desired to provide a guide for positioning material in building a wall about the frame.

WARD P. KESSLER.